US008909614B2

(12) United States Patent
Kan et al.

(10) Patent No.: US 8,909,614 B2
(45) Date of Patent: Dec. 9, 2014

(54) DATA ACCESS LOCATION SELECTING SYSTEM, METHOD, AND PROGRAM

(75) Inventors: Masaki Kan, Tokyo (JP); Dai Kobayashi, Tokyo (JP); Yasuo Itabashi, Tokyo (JP)

(73) Assignee: NEC Corporation, Tokyo (JP)

( * ) Notice: Subject to any disclaimer, the term of this patent is extended or adjusted under 35 U.S.C. 154(b) by 128 days.

(21) Appl. No.: 13/583,964

(22) PCT Filed: Jan. 21, 2011

(86) PCT No.: PCT/JP2011/000311
§ 371 (c)(1),
(2), (4) Date: Oct. 16, 2012

(87) PCT Pub. No.: WO2011/121869
PCT Pub. Date: Oct. 6, 2011

(65) Prior Publication Data
US 2013/0041875 A1    Feb. 14, 2013

(30) Foreign Application Priority Data
Mar. 29, 2010  (JP) .................................. 2010-075514

(51) Int. Cl.
*G06F 17/30*     (2006.01)
*G06F 3/06*      (2006.01)

(52) U.S. Cl.
CPC .............. *G06F 3/0635* (2013.01); *G06F 3/067* (2013.01); *G06F 3/0625* (2013.01); *Y02B 60/1246* (2013.01)
USPC ....................................................... 707/705

(58) Field of Classification Search
CPC ............................................... G06F 17/30147
See application file for complete search history.

(56) References Cited

U.S. PATENT DOCUMENTS

| 6,385,641 | B1 * | 5/2002 | Jiang et al. ..................... 709/203 |
| 8,006,111 | B1 * | 8/2011 | Faibish et al. .................. 713/324 |
| 2002/0169928 | A1 * | 11/2002 | Kimura et al. ................ 711/137 |
| 2004/0205143 | A1 | 10/2004 | Uemura |
| 2008/0059602 | A1 | 3/2008 | Matsuda et al. |
| 2009/0254702 | A1 * | 10/2009 | Kumano et al. ............... 711/112 |

FOREIGN PATENT DOCUMENTS

| JP | 2003280950 A | 10/2003 |
| JP | 2004240803 A | 8/2004 |
| JP | 2005539303 A | 12/2005 |

(Continued)

OTHER PUBLICATIONS

The international search report for PCT/JP2011/000311 mailed on Mar. 15, 2011.

(Continued)

*Primary Examiner* — Hung Q Pham
(74) *Attorney, Agent, or Firm* — Sughrue Mion, PLLC

(57) ABSTRACT

Access destination determination means determines a read destination and/or a write destination of specified data from nodes corresponding to the data and stored in data store destination storage means. Access probability calculation means calculates an access probability based on a history of accesses to the data, and stores the calculated access probability in access probability storage means. When no node corresponding to the specified data is stored in the data store destination storage means, access probability estimation means estimates an access probability of the data based on access probabilities stored in the access probability storage means, and the access destination determination means determines a write destination of the data based on the estimated access probability.

25 Claims, 6 Drawing Sheets

(56) References Cited

FOREIGN PATENT DOCUMENTS

| | | |
|---|---|---|
| JP | 2007-193441 A | 8/2007 |
| JP | 2008059315 A | 3/2008 |
| JP | 2009157571 A | 7/2009 |
| JP | 2011-186561 A | 9/2011 |
| WO | 2004025628 A2 | 3/2004 |
| WO | 2011/007599 A1 | 1/2011 |

OTHER PUBLICATIONS

Japanese Office Action for JP 2012-508037 mailed on Jun. 4, 2013 with partial English Translation.

* cited by examiner

FIG. 3

| FILE NAME | NODE |
|---|---|
| /home/a.txt | node1, node2 |
| /home/b.txt | node1, node2 |
| /home/c.txt | node1, node3 |
| /tmp/a.txt | node4 |
| ... | ... |

FIG. 4

| Read or Write | dest (FILE NAME) | time |
|---|---|---|
| Write | /home/a.txt | 2009.01.01 01:00:01 |
| Write | /home/b.txt | 2009.01.01 01:00:01 |
| Write | /home/c.log | 2009.01.01 01:00:03 |
| Write | /home/c.log | 2009.01.01 01:00:04 |
| Read | /home/a.txt | 2009.01.01 01:00:06 |
| Write | /home/a.txt | 2009.01.01 01:00:07 |
| Write | /home/b.txt | 2009.01.01 01:00:09 |
| Read | /home/b.txt | 2009.01.01 01:00:10 |
| Read | /home/c.log | 2009.01.01 01:00:10 |
| Read | /home/a.txt | 2009.01.01 01:00:11 |
| ... | ... | ... |

FIG. 5

| FILE NAME | ACCESS PROBABILITY BY TIME ZONE IN ONE DAY | | | | MONTHLY PROBABILITY | | | | | |
|---|---|---|---|---|---|---|---|---|---|---|
| | 0-12 | | 12-24 | | EARLY PART OF THE MONTH | | MIDDLE PART OF THE MONTH | | LATE PART OF THE MONTH | |
| | Read | Write | Read | Write | Read | Write | Read | Write | Read | Write |
| /home/a.txt | 10% | 0% | 0% | 5% | 100% | 33% | 0% | 33% | 0% | 33% |
| /home/b.txt | 0% | 0% | 3% | 3% | 0% | 0% | 0% | 100% | 100% | 0% |
| /home/c.log | 0% | 30% | 100% | 100% | 100% | 100% | 100% | 100% | 100% | 100% |
| /home/a.txt | 100% | 100% | 0% | 0% | 100% | 100% | 100% | 100% | 100% | 100% |

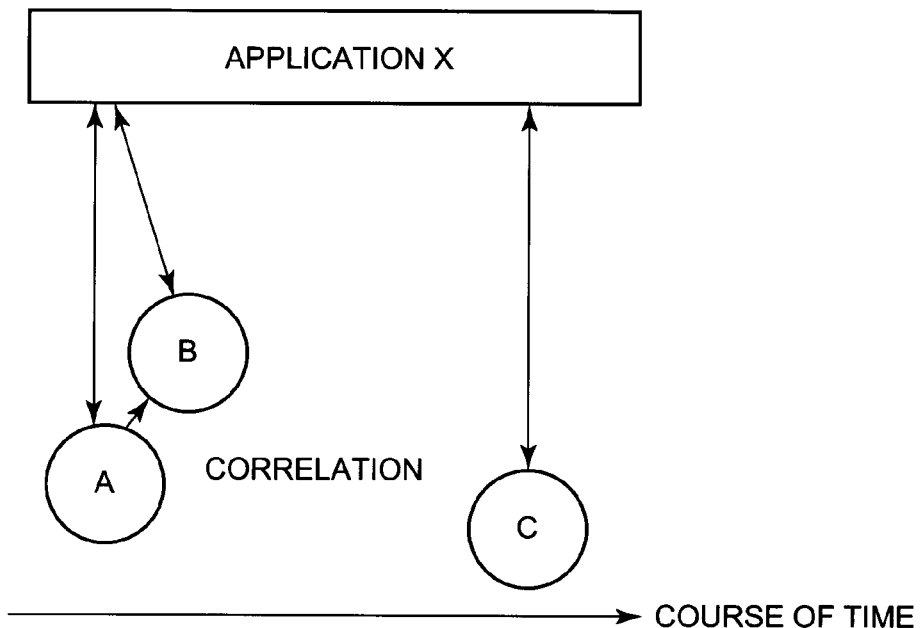

DATA ACCESS LOCATION SELECTING SYSTEM, METHOD, AND PROGRAM

TECHNICAL FIELD

The present invention relates to a data access location selecting system, a data access location selecting method, and a data access location selecting program for selecting a read destination and/or a write destination of data in a distributed storage system.

BACKGROUND ART

In recent years, data volumes processed by computer systems have been increasing. Therefore, in a large-scale computer system, a distributed storage system for distributing and storing data into multiple storage nodes has been used.

In the meantime, as the computer system and the storage system grow in size, the power consumption of the computer system is becoming a problem.

Therefore, attempts to reduce the power requirements of the storage system have been made, such as to change the rotation speed of a disk drive or to turn a disk off. An example of the technology using such a mechanism is disclosed in Patent Literature (PTL) 1. In a method disclosed in PTL 1, the disk drive is turned off when no access to the disk drive is expected to reduce the power consumption of the system.

Further, a system for reallocating data in a distributed storage system by using non-access probability calculated based on statistics information on accesses to distributed storage nodes is disclosed in Patent Literature (PTL) 2. In the system disclosed in PTL 2, data allocation is so made that an expected value of a non-access period will become high and hence the period of keeping each disk node in a power saving mode can be longer.

In addition, a computer system for distributing I/O (Input/Output) load properly is disclosed in Patent Literature (PTL) 3. In the computer system disclosed in PTL 3, an average frequency of I/O accesses to each integrated device is calculated as an estimate of the I/O access frequency.

CITATION LIST

Patent Literatures

PTL 1: Japanese Patent Application Publication (Translation of PCT Application) No. 2005-539303 (Paragraph 0023)
PTL 2: Japanese Patent Application Publication No. 2009-157571 (Paragraphs 0097 to 0102)
PTL 3: Japanese Patent Application Publication No. 2008-59315 (Paragraphs 0194 and 0198, and FIGS. 12 and 22)

SUMMARY OF INVENTION

Technical Problem

Suppose that when there has been no access to a disk of a computer node for a certain period, power saving control such as to turn the disk off is performed, for example, by using the method disclosed in PTL 1. However, when access to the node concerned occurs immediately after the processing for turning the disk off, it is required to restart the rotation of the disk or to restart the node. Therefore, restarting the rotation of the disk or restarting the node will more increase the electricity costs. Further, since the operating time on the client side also increases due to access latency, the power consumption will further increase.

Thus, in the method disclosed in PTL 1, the operating states of nodes making up the distributed system cannot be controlled properly, and this could lead to excess power consumption.

In the case of using the system disclosed in PTL 2, data is reallocated based on the non-access probability calculated after new data is registered. Therefore, it is highly probable that even data once registered is moved based on the calculated probability. In such a case, there is a problem that the migration cost is required. Recently, since storage devices such as hard disk drives (hereinafter abbreviated as HDD) have grown in capacity, long time is required to copy data, and this could lead to excess power consumption.

Further, the computer system disclosed in PTL 3 does not take into account the access frequency of newly added data, and the storage destination of the new data is determined depending on the access states of existing storages. Thus, if the new data is stored without respect to the access frequency of the new data, the node to store the data cannot be controlled properly, resulting in an increase in power consumption related to the data access. Therefore, even when new data is added, it is desired that the power consumption of data access should be suppressed properly.

To this end, it is an exemplary object of the present invention to provide a data access location selecting system, a data access location selecting method, and a data access location selecting program, capable of suppressing power consumption related to data access even when new data is added in a distributed storage system.

Solution to Problem

A data access location selecting system according to the present invention includes at least one or more nodes for storing data, and a management server for selecting a read destination and/or a write destination of data from the nodes, characterized in that the management server includes: data store destination storage means for storing a data storage destination in association with a node; access destination determination means for determining the read destination and/or the write destination of specified data from nodes corresponding to the data and stored in the data store destination storage means; access probability storage means for storing an access probability indicative of a probability that data reading and/or writing is performed on each node; access probability calculation means for calculating the access probability based on a history of accesses to the data, and storing the calculated access probability in the access probability storage means; and access probability estimation means for estimating an access probability of the specified data based on access probabilities stored in the access probability storage means, wherein when no node corresponding to the specified data is stored in the data store destination storage means, the access probability estimation means estimates an access probability of the data, and the access destination determination means determines a write destination of the data based on the estimated access probability when no node corresponding to the specified data is stored in the data store destination storage means. Note that "reading and/or writing" means "reading" or "writing," or "both reading and writing."

Another data access location selecting system according to the present invention includes multiple nodes for storing data, characterized in that each of the nodes includes: data store destination storage means for storing a data storage destination in association with a node; access destination determi nation means for determining a read destination and/or a write destination of specified data from nodes corresponding to the data and stored in the data store destination storage means; access probability storage means for storing an access probability indicative of a probability that data reading and/or writing is performed on each node; access probability calculation means for calculating the access probability based on a history of accesses to the data, and storing the calculated access probability in the access probability storage means; and access probability estimation means for estimating an access probability of the specified data based on the access probabilities stored in the access probability storage means, wherein when no node corresponding to the specified data is stored in the data store destination storage means, the access probability estimation means estimates an access probability of the data, and the access destination determination means determines a write destination of the data based on the estimated access probability when no node corresponding to the specified data is stored in the data store destination storage means.

A data access location selecting method according to the present invention is characterized by including: causing a selection device for selecting a read destination and/or a write destination of data from among at least one or more nodes storing the data to determine the read destination and/or the write destination of specified data from among nodes corresponding to the data and stored in data store in destination storage means for storing a data storage destination in association with a node; causing the selection device to calculate an access probability indicative of a probability that data reading and/or writing is performed on each node based on a history of accesses to the data, and storing the calculated access probability in access probability storage means; causing the selection device to estimate an access probability of the specified data based on access probabilities stored in the access probability storage means when no node corresponding to the specified data is stored in the data store destination storage means; and causing the selection device to determine a write destination of the data based on the estimated access probability when no node corresponding to the specified data is stored in the data store destination storage means.

A data access location selecting program applied to a computer for selecting a read destination and/or a write destination of data from at least one or more nodes storing the data is characterized by causing the computer to perform: access destination determination processing for determining the read destination and/or the write destination of specified data from nodes corresponding to the data and stored in data store destination storage means for storing a data storage destination in association with a node; access probability calculation processing for calculating an access probability indicative of a probability that data reading and/or writing is performed on each node based on a history of accesses to the data, and storing the calculated access probability in access probability storage means; and access probability estimation processing for estimating an access probability of the specified data based on access probabilities stored in the access probability storage means, wherein when no node corresponding to the specified data is stored in the data store destination storage means, the access probability of the data is estimated in the access probability estimation processing, and a write destination of the data is determined based on the estimated access probability in the access destination determination processing when no node corresponding to the specified data is stored in the data store destination storage means.

Advantageous Effect of Invention

According to the present invention, even when new data is added in a distributed storage system, the power consumption related to data access can be suppressed.

BRIEF DESCRIPTION OF DRAWINGS

FIG. 3 It depicts an explanatory chart showing an example of storing data storage destinations in a table format.

FIG. 4 It depicts an explanatory chart showing an example of histories of access request commands.

FIG. 5 It depicts an explanatory chart showing an example of access probabilities.

FIG. 6 It depicts an explanatory diagram showing an example of the operation of application X to perform data access.

FIG. 7 It depicts an explanatory chart showing an example of operating states of nodes.

DESCRIPTION OF EMBODIMENT

An exemplary embodiment of the present invention will now be described with reference to the accompanying drawings. In the following, a case where a data access location selecting system according to the present invention is applied to a distributed storage system made up of multiple computer nodes will be described.

Figure 1:
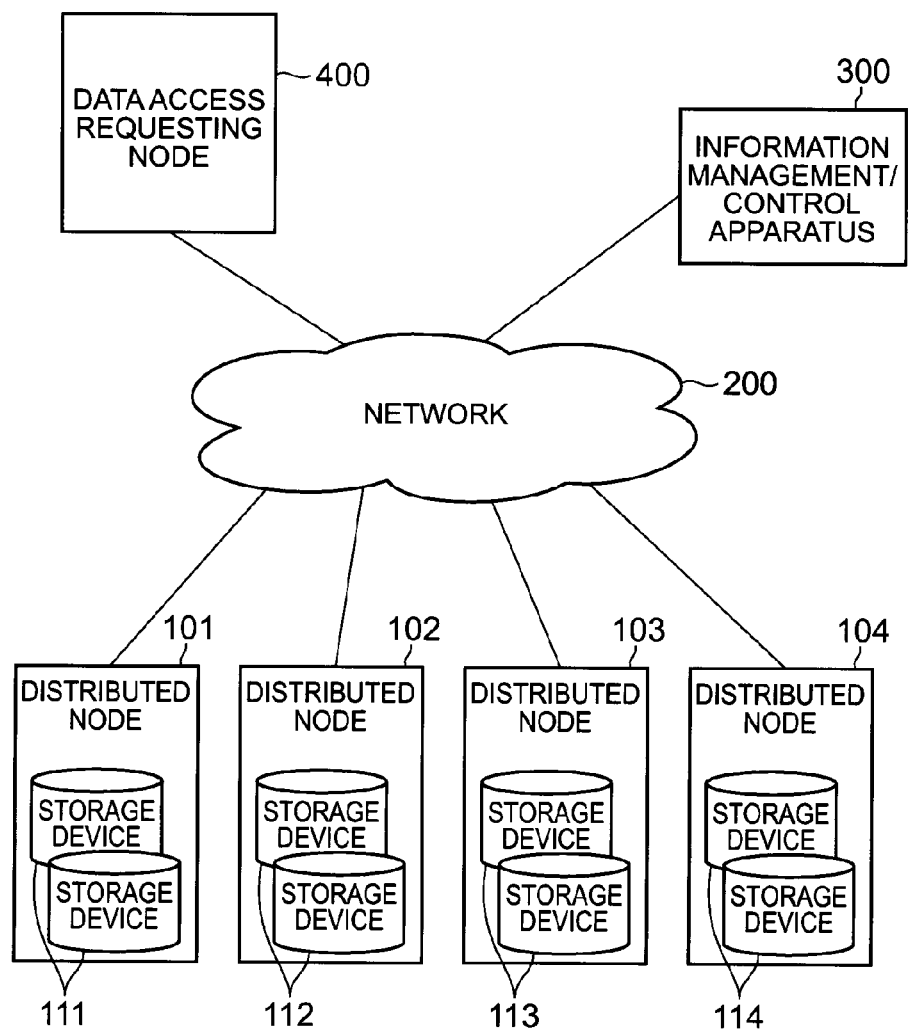
FIG. 1 depicts an explanatory diagram showing one exemplary embodiment of a data access location selecting system according to the present invention.

FIG. 1 is an explanatory diagram showing one exemplary embodiment of a data access location selecting system according to the present invention. The data access location selecting system according to the present invention includes distributed nodes 101 to 104, an information management/control apparatus 300, and a data access requesting node 400. The distributed nodes 101 to 104, the information management/control apparatus 300, and the data access requesting node 400 are connected through a communication network 200.

The distributed nodes 101 to 104 are computers used in a distributed storage system, each of which includes one or more storage devices 111 to 114. Each of the distributed nodes 101 to 104 also includes a component the operating state of which is controllable (hereinafter referred to a controlled component). This controlled component means each device used in each of the distributed nodes, such as a CPU as an arithmetic unit, an HDD, or a power-supply unit for the computer. Further, control of the operating state means that a control instruction is given to the operation of each controlled component, such as to reduce the rotational speed of the CPU, reduce the rotational speed of the HDD, halt the CPU, halt the HDD, or turn off the power-supply unit.

The information management/control apparatus 300 is an apparatus having the function of registering information for determining the location of data to be stored in the distributed storage system and managing the information. For example, the role of the information management/control apparatus 300 corresponds to the role of a metadata server responsible for managing on which distributed node a data block of a file is to be stored in a distributed file system as an example of the distributed storage system, and tracking the data block.

The distributed file system including a metadata server will be described in the following reference: Japanese Patent Application Publication No. 2003-522360.

The data access requesting node 400 is a computer node to perform data access to the distributed storage system in order to carry out any operation using the data accessed. This data access involves either of data reading processing and data writing processing, or both reading and writing of data. The writing processing includes existing data update processing and deletion processing as well as new data writing processing. The data access requesting node 400 may be any computer node other than the distributed nodes 101 to 104, or any of the distributed nodes 101 to 104 may act as the data access requesting node 400 (i.e., it may perform data access and carry out an operation). In the following, description will be made of a case where the data access requesting node 400 and the distributed nodes 101 to 104 are different computer nodes.

Each of the distributed nodes 101 to 104, the information management/control apparatus 300, and the data access requesting node 400 can be an IA (Intel Architecture) servers each of which includes a CPU, a semiconductor memory, a communication interface, and the like. Note that Intel is the registered trademark.

In the example shown in FIG. 1, it is shown a case where the data access location selecting system has four distributed nodes, namely distributed node 101 to distributed node 104. Note that the number of distributed nodes is not limited to four, and it is may be two or more. Further, in the example shown in FIG. 1, it is shown a case where each distributed node has two storage devices, but the number of storage devices is not limited to two. The number of storage devices may be one, or three or more. Since the functions of the distributed nodes 101 to 104 are the same, the following description will target the distributed node 101.

Figure 2:
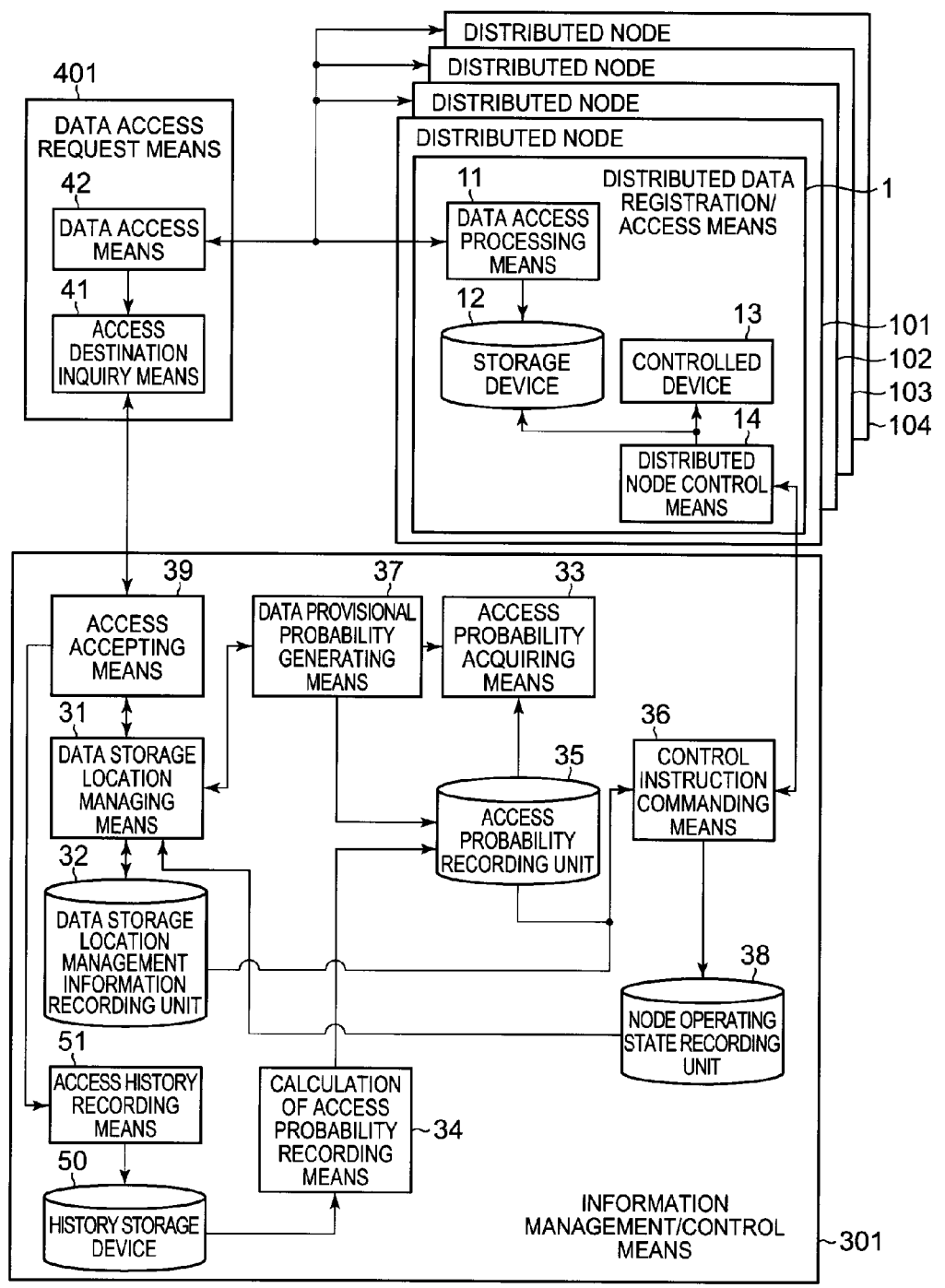
FIG. 2 It depicts a block diagram showing an example of the data access location selecting system.

FIG. 2 is a block diagram showing an example of the data access location selecting system. The data access location selecting system according to the present invention is implemented by distributed data registration/access means 1, information management/control means 301, and data access request means 401.

In the following, description will be made of a case where the distributed data registration/access means 1 operates on each distributed node 101 in FIG. 1, the information management/control means 301 operates in the information management/control apparatus 300 in FIG. 1, and the data access request means 401 operates on the data access requesting node 400 in FIG. 1, respectively. Note that the apparatus in which each of the means (more specifically, the distributed data registration/access means 1, the information management/control means 301, and the data access request means 401) operates is not limited to the above apparatus.

For example, in the example shown in FIG. 2, there is shown a case where the information management/control means 301 operates in the apparatus (information management/control apparatus 300) different from the distributed node 101. However, the information management/control means 301 may operate on one or more computers of the distributed nodes 101 to 104. Specifically, a program (software) running as the information management/control means 301 may be installed on the distributed nodes 101 to 104 so that the CPU, for example, will operate according to the program. In other words, the data access location selecting system according to this exemplary embodiment can include multiple distributed nodes.

The distributed data registration/access means 1 includes data access processing means 11, a storage device 12, a controlled device 13, and distributed node control means 14. The above-mentioned controlled component corresponds to the controlled device 13 in FIG. 2.

The storage device 12 stores data as a target in the distributed storage system. The storage device 111 illustrated in FIG. 1 corresponds to the storage device 12. The storage device 12 is, for example, a storage medium, such as an HDD, an SSD (Solid State Drive), or a semiconductor memory.

The data access processing means 11 accepts a data access request from the data access request means 401. Then, the data access processing means 11 accesses the storage device 12 to read data as a target of the request, and sends the data access request means 401 the result as a response to the request.

The controlled device 13 is a device (i.e., controlled component) the operating state of which is controllable. Specifically, in the distributed data registration/access means 1, the controlled device 13 indicates a hardware device the operating state of which is controllable. The controlled device 13 is, for example, an arithmetic unit such as a CPU, an extra communication interface, or the like. The storage device 12 is also one controlled component 12, but the controlled device 13 is shown separately from the storage device 12 in the example shown in FIG. 2.

The distributed node control means 14 provides a control instruction to the devices the operating state of which is controllable (specifically, the storage device 12 and the controlled device 13 as controlled components). The content of the control instruction is, for example, the content illustrated in the description of the controlled component.

The data access request means 401 includes access destination inquiry means 41 and data access means 42. The access destination inquiry means 41 makes an inquiry to the information management/control means 301 about read destination information on data to be read (e.g., information indicative of a distributed node on which the data is stored) or write destination information on data to be written (e.g., information indicative of a distributed node on which the data is to be stored), and receives the inquiry result (hereinafter referred to as access destination information). In the following, a request made by the data access request means 401 to the information management/control means 301 to inquire the access destination is referred to as a data access request command.

When the access destination inquiry means 41 receives the access destination information, the data access means 42 performs data access to the distributed node 101 as the access destination. Specifically, the data access means 42 makes a request to the data access processing means 11 for access processing (e.g., data writing processing or reading processing) desired to perform on the storage device 12 of the distributed node 101. In the following description, writing of data and reading of data may also be referred to as Write and Read, respectively.

The information management/control means 301 includes data storage location managing means 31, a data storage location management information recording unit 32, access probability acquiring means 33, access probability calculation/recording means 34, an access probability recording unit 35, control instruction commanding means 36, data provisional probability generating means 37, a node operating state recording unit 38, access accepting means 39, a history storage unit 50, and access history recording means 51.

The access accepting means 39 accepts a date access request command from the data access request means 401. Then, the access accepting means 39 requests the data shortage location managing means 31 to select an access destination, and sends the selection result to the data access request means 401.

Here, the data access request command includes information for identifying data, an execution instruction, and data necessary for execution. The access accepting means 39 accepts a data access request command, such as "Read file A," or "Write data "XXXX" to file B." In this case, "Read . . ." or "Write . . ." corresponds to the execution instruction. Further, for example, as the data necessary for execution, there is data in Write command. In SCSI (Small Computer system Interface), this data corresponds to data transferred from an initiator to a target in data phase. In iSCSI as a standard for using the SCSI protocol on TCP/IP, the Write command as the execution instruction is transmitted using a SCSI Command PDU, and the data of Write command is transmitted using a SCSI DATA Out PDU. Further, the information for identifying data corresponds to a block address of the Write destination or the like included in the Write command. Further, for example, in a distributed KeyValueStore system, Key in the case of put, put, and Value stored in association with Key are included in the data access request command. In this case, put is the execution instruction, Key is the information for identifying data, and Value is necessary data.

The data storage location management information recording unit 32 stores a data storage destination registered and managed in the distributed storage system. Specifically, the data storage location management information recording unit 32 stores the data storage destination in association with the distributed node 101. The data storage destination to be stored in the data storage location management information recording unit 32 is stored by the data storage location managing means 31 to be described later. As for any data storage destination already stored on the distributed node 101, for example, the user or the like may prestore it in the data storage location management information recording unit 32.

Further, the content stored in the data storage location management information recording unit 32 may be information indicative of a rule, such as to store directory under "/home/node 1" and files on the distributed node 101 or to store directory under "/home/node 2" and files on the distributed node 102. The data storage location management information recording unit 32 is implemented by any recording medium such as a magnetic disk.

The data storage location managing means 31 manages an actual data storage destination registered and managed in the distributed storage system, and determines an access destination of data specified in the access request from the access accepting means 39. Specifically, when information on distributed nodes corresponding to the specified data is stored in the data storage location management information recording unit 32, the data storage location managing means 31 determines a read destination and/or a write destination of the data from among the distributed nodes corresponding to the specified data.

For example, when the data storage location management information recording unit 32 stores data storage destinations in a table format defined by database software, the data storage location managing means 31 may perform search processing on the table to retrieve a storage destination of the data.

FIG. 3 is an explanatory chart showing an example of storing the data storage destinations in a table format. In the example shown in FIG. 3, it is shown that the data storage location management information recording unit 32 stores a file name for identifying data and a node(s) storing the file in association with each other. In the example shown in FIG. 3, it is also shown that data is distributed to and stored on two or more nodes in a file-by-file basis. It is assumed that node names node 1, node 2, node 3, and node 4 are given to the distributed node 101, the distributed node 102, the distributed node 103, and the distributed node 104, respectively.

For example, it is shown that a file "/home/a.txt" illustrated in FIG. 3 is stored on node 1 and node 2. Here, when nodes on which the file "/home/a.txt" is stored are to be found, the data storage location managing means 31 has just to search the "/home/a.txt" rows from the "file name" column and specify corresponding nodes from the "node" column of retrieved data.

When the data storage location management information recording unit 32 stores data storage destinations in a table format defined by database software, the data storage location managing means 31 can perform additional processing or update processing on the table to update the data storage destinations. For example, when it is desired to change file storage locations, the data storage location managing means 31 has just to rewrite corresponding records in the table along with processing for copying and moving the storage locations of actual data. Further, when a new file is to be stored, the data storage location managing means 31 has just to add, to the table, a record indicative of the storage location(s) of the new data.

In the above description, data storage destinations are stored in the data storage location management information recording unit 32 in a combination of a file name and a node name(s). However, the format in which the data storage location management information recording unit 32 stores data is not limited to the above format. For example, the data storage location management information recording unit 32 may store node name list information and hash functions. In this case, the data storage location managing means 31 may determine a storage node destination calculated by a consistent hashing method to be a read destination and/or a write destination of the data.

On the other hand, when no information on a distributed node(s) corresponding to the specified data is stored in the data storage location management information recording unit 32, the read destination and/or write destination of the data is determined based on the processing result of the data provisional probability generating means 37 to be described later.

The access history recording means 51 stores, in the history storage unit 50, the content of the access request command accepted by the access accepting means 39 as a history. The history storage unit 50 stores a history of the access request command in accordance with an instruction from the access history recording means 51. The history storage unit 50 is implemented, for example, by a recording medium such as a magnetic disk.

The access history recording means 51 may also store the history of the access request command in the history storage unit 50, for example, as a journal log, or in a table format illustrated in FIG. 4. FIG. 4 is an explanatory chart showing an example of the histories of access request commands stored by the access history recording means 51. In the example shown in FIG. 4, it is shown that the histories of access request commands are stored to make association among whether the execution instruction is a read instruction or a write instruction ("Read or Write" in FIG. 4), to which file the instruction is given ("dest(file name)" in FIG. 4, and when the instruction is effectuated ("time" in FIG. 4).

The access history recording means 51 does not need to store, in the history storage unit 50, all histories of access request commands accepted by the access accepting means 39. The access history recording means 51 may sample some access request commands and store them in the history storage unit 50.

The access probability recording unit 35 stores an access probability representing the probability of reading and/or writing of data stored on each distributed node. In the access probability recording unit 35, an access probability calculated by the access probability calculation/recording means 34 to be described later or the data provisional probability generating means 37 is stored. The access probability recording unit 35 is implemented, for example, by any recording medium such as a magnetic disk.

The access probability calculation/recording means 34 calculates an access probability based on the access history of the data, and stores the calculated access probability in the access probability recording unit 35. Specifically, the access probability calculation/recording means 34 refers to the history of the access request command stored in the history storage unit 50 to calculate an access probability based on access history information on the same file name. Since the access probability is calculated based on the access history, it can be said that it is information indicative of the degree to which each file is accessed.

For example, the access probability calculation/recording means 34 may calculate the access probability by dividing the number of accesses to the data by a period since the data was stored. For example, the access probability calculation/recording means 34 can calculate the access probability of occurrence of READ access between 12 a.m. and 12 p.m. by operating the elapsed days since the generation of the file "/home/a.txt" as the denominator and the number of READ accesses between 12 a.m. and 12 p.m. as the numerator.

FIG. 5 is an explanatory chart showing an example of access probabilities. In the example shown in FIG. 5, it is shown that the access probability recording unit 35 stores data specified by each file name in such a manner that the access probability by time zone is associated with the access probability by date. In the example shown in FIG. 5, it is shown that the probability of occurrence of READ access to the file "/home/a.txt" between 12 a.m. and 12 p.m. is ten percent and the probability of occurrence of Write access is zero percent. For example, in a case of a file to which READ access occurs at 3 a.m. at a rate of once every ten days, the access probabilities are as indicated above.

Further, in the example shown in FIG. 5, the probability of occurrence of READ access to the file "/home/a.txt" in the early part of the month is 100 percent and the probability of occurrence of READ access in the middle and late parts of the month is zero percent. From this, it is found that the file "/home/a.txt" is a file to which READ access in the early part of the month (e.g., the first ten days of the month) occurs at a rate of about once every 3.3 days.

In the example shown in FIG. 5, the description is made of the case where the access probability recording unit 35 stores the access probabilities every period, i.e., in the early part of the month, the middle part of the month, and the late part of the month. However, the periods of storing the access probabilities are not limited to the above periods. For example, the access probability calculation/recording means 34 may divide one year into four periods (e.g., periods 1Q, 2Q, 3Q, and 4Q) to calculate access probabilities and stores the access probabilities for each period in the access probability recording unit 35, respectively. Further, the access probability calculation/recording means 34 may calculate monthly access probabilities (i.e., periods of January to December) and store the monthly access probabilities in the access probability recording unit 35.

Further, the access probability calculation/recording means 34 may store, in the access probability recording unit 35, information indicative of the number of data accesses (hereinafter referred to as the number of accesses) in a predetermined period. For example, when the number of accesses in a unit time reaches a preset value or more, the access probability calculation/recording means 34 may store the number of accesses in the access probability recording unit 35.

Further, the access probability calculation/recording means 34 may store, in the access probability recording unit 35, information calculated from the access probability and the number of accesses (hereinafter referred to as an evaluation value). For example, the access probability calculation/recording means 34 may calculate, as the evaluation value, a value obtained by multiplying the access probability by the number of accesses, and store the calculated evaluation value in the access probability recording unit 35.

The following will use a specific example to describe a calculation method for the evaluation value. For example, it is assumed that the access probability in a specified time zone is ten percent. In this case, a file accessed 100 times on an average is different in access characteristics from a file accessed once. Therefore, the access probability calculation/recording means 34 calculates the evaluation value of the file accessed 100 times on an average as $\frac{1}{10} \times 100 = 10$, and the evaluation value of the file accessed once on an average as $\frac{1}{10} \times 1 = 0.1$. Then, the access probability calculation/recording means 34 stores, in the access probability recording unit 35, the calculated evaluation values in association with each target file.

Thus, the calculation of evaluation values makes it possible to distinguish between files different in access characteristics even if the access probabilities are the same. The calculation method for the evaluation values is not limited to the above method. It can be said from the above description that the evaluation value is information indicative of the characteristics of access to data.

Like the data storage location management information recording unit 32, the access probability recording unit 35 may also store data storage destinations in a table format defined by database software. In this case, the access probability calculation/recording means 34 may perform search processing and additional processing or update processing on the table to retrieve and update access probabilities.

The access probability acquiring means 33 accepts an access probability acquiring request for each data from the data provisional probability generating means 37. Then, the access probability acquiring means 33 searches for and acquires an access probability corresponding to specified data from the access probability recording unit 35, and sends the acquired access probability to the data provisional probability generating means 37.

When no distributed node corresponding to the specified data is stored in the data storage location management information recording unit 32, the data provisional probability generating means 37 calculates a provisional access probability of the data to be newly stored in the storage device 12 on a distributed node(s). In the following, calculating a provisional access probability may be referred to as estimating an access probability.

The following will specifically describe a calculation method for the provisional access probability. When a co-occurrence probability that data b is accessed in seconds after data a is accessed is denoted as Ps(b:a), the co-occurrence probability Ps(b:a) is calculated by Equation 1 below. Note that the number of accesses to data b can be extracted from the access history stored in the history storage unit 50.

$$Ps(b{:}a) = \text{Number of accesses to data } b \text{ in } s \text{ seconds after data } a \text{ is accessed/Total number of accesses to data } a \quad \text{(Eq. 1)}$$

Therefore, a probability Pt(b:a) that data b is accessed in t seconds after data a is accessed is Σ Ps(b:a).

When a probability that a data set A {a, b, . . . , n} selected from a set W is accessed in t seconds is denoted as Pt(A:W), the data provisional probability generating means 37 may calculate the probability Pt(A:W) by using the following Equation 2:

$$Pt(A{:}W) = Pt(a{:}W) + Pt(b{:}W) + \ldots + Pt(n{:}W) \quad \text{(Eq. 2)}.$$

Here, the set W may cover all data accessed up to now in the entire system, or all data accessed in the last x seconds in the entire system. Further, access data to a certain node may be set as the set W, or only data having co-occurrence relations in correlation mining may be set as the set W (to set the probabilities of the other data to zero, or the like). Note that the set W can be preset in consideration of the data volume, the time required for probability calculations, or the like.

As mentioned above, the data provisional probability generating means 37 calculates a co-occurrence probability based on the histories of accesses to data and their access probabilities so that the probability of access to specified data can be estimated. The data provisional probability generating means 37 may set the calculated co-occurrence probability as a provisional access probability. However, the calculation method for the access probability is not limited to the above method.

For example, the data provisional probability generating means 37 may focus on the attributes of a newly created file to calculate a provisional access probability. The following will use a specific example to describe a method of calculating a provisional access probability. Here, description will be made of a case where a file named "/home/x.log" is newly created, and a provisional access probability is calculated as a future access probability of the file "/home/x.log."

First, focusing on the extension "log" of the file "/home/x.log," the data provisional probability generating means 37 requests the access probability acquiring means 33 to acquire the access probabilities of files the extension of which is "log" from the access probability recording unit 35. The data provisional probability generating means 37 averages out the access probabilities of all the log files obtained to set the averaged result as a provisional access probability of the file "/home/x.log." Then, the data provisional probability generating means 37 stores the provisional access probability in the access probability recording unit 35.

The above describes the method of calculating a provisional access probability based on the extension. Further, the data provisional probability generating means 37 may takes a directory path (e.g., "/home") into account in addition to the extension. In this case, the data provisional probability generating means 37 may request the access probability acquiring means 33 to acquire access probabilities of all files whose extension is "log" and directory path is "/home" from the access probability recording unit 35. In this case, the data provisional probability generating means 37 may set an average of the acquired access probabilities as a provisional access probability of the file "/home/x.log."

Alternatively, when calculating a provisional access probability, the data provisional probability generating means 37 may take into account an application by which data access to a file was performed (i.e., a caller of the file), rather than the file name of the file or the storage location. In this case, the data provisional probability generating means 37 may request the access probability acquiring means 33 to acquire all access probabilities with the same name of the application that performed data access from the access probability recording unit 35 to set an average of the acquired access probabilities as a provisional access probability.

The following will give a detailed description of a case where a provisional access probability is calculated by taking into account the application for accessing a file. FIG. 6 is an explanatory diagram showing an example of the operation of application X to perform data access. In FIG. 6, circled A, B, and C denote data accessed from application X, respectively. Further, the direction from left to right in the figure indicates the course of the time for application X to access data.

As shown in FIG. 6, it is assumed that pieces of data accessed from an application are correlated with each other. In the example shown in FIG. 6, there is the following correlation: Data B is accessed after data A is accessed, and data C is accessed after data A and data B are accessed.

From this correlation, it can be determined that the pieces of data accessed from the same application have a high probability of being accessed at the same time. Therefore, the data provisional probability generating means 37 calculates a provisional access probability based on the access probabilities with the same name of an application that accessed new data. As the calculation method for the provisional access probability, for example, a method of calculating an access probability using a co-occurrence probability can also be employed.

To enable the data provisional probability generating means 37 to acquire access probabilities based on the application that performed data access to a file, the access probability recording unit 35 has just to store the name of the application that performed data access to the file together with the file name.

Specifically, the application name is added to the data access request from the data access request means 401. When the access accepting means 39 receives the data access request, the access history recording means 51 stores, in the history storage unit 50, a history in which the application name is added to the content of the access request command accepted by the access accepting means 39. Then, the access probability calculation/recording means 34 uses the history of the access request command to calculate the access probability to the file for each application, and stores it in the access probability recording unit 35. The history storage unit 50 and the access probability recording unit 35 have just to store the file name and the application name in association with each other.

The data provisional probability generating means 37 may also use an evaluation value instead of the access probabilities to estimate the access probability of specified data. As the method of estimating an access probability using the evaluation value, the same method as the estimation method using the access probabilities stored in the access probability recording unit 35 can be employed.

Thus, the data provisional probability generating means 37 estimates an access probability to the specified data based on the access probabilities stored in the access probability recording unit 35. Then, the data provisional probability generating means 37 stores the estimated access probability in the access probability recording unit 35.

Here, when the data provisional probability generating means 37 calculates a provisional access probability for the specified data, the data storage location managing means 31 determines a write destination of the data based on the estimated access probability. The data storage location managing means 31 may determine, to be the write destination of the data, such a distributed node that stores data whose access probability recorded in the access probability recording unit 35 falls within a range between the provisional access probability and a predetermined value.

Specifically, the data storage location managing means 31 extracts data similar to the provisional access probability (e.g., data whose difference in access probability falls within a predetermined range) from the access probability recording unit 35. Next, the data storage location managing means 31 reads, from the data storage location management information recording unit 32, a distributed node on which the specified data is stored. Then, the data storage location managing means 31 determines the read distributed node to be a storage location (which may also be referred to as a location to be allocated) of the data.

The data storage location managing means 31 may also determine, to be the write destination of the data, a distributed node the estimated access probability of which is highest or which is in operation in a time zone in which the access probability exceeds a predetermined access probability. Whether the distributed node is in operation or not is determined based on schedule information to be described later.

In the following, description will be made of a case where a file access request command includes a file name and an execution instruction. Note that the data access request means 401 can add necessary information to the access request command according to the algorithm for calculating a provisional access probability of data or the format desired to be managed and registered as the access probability, and define the instruction format according to the added information. The data access request means 401 can also use a normal file access protocol as long as it includes data as a target (hereinafter referred to an access target) to be read and/or written and information capable of recognizing the access content.

The node operating state recording unit 38 stores the operating states of computers (i.e., distributed nodes 101 to 104) on which the distributed data registration/access means 1 operates. FIG. 7 is an explanatory chart showing an example of the operating states of nodes. Here, a state in which a node works normally is written as "active." A low-speed state of a node (e.g., a state in which the number of rotations of the disk is reduced) is written as "low speed." A state in which a node is halted is written as "standby." In the example shown in FIG. 7, it is shown that node 1 and node 4 are working normally, node 2 is in the low-speed state, and node 3 is halted state.

The operating states stored in the node operating state recording unit 38 are updated when the control instruction commanding means 36 to be described later performs processing for changing node states. For example, upon start-up of the system, all distributed nodes connected to the data access location selecting system can be prestored as the halted state in the node operating state recording unit 38. The node operating state recording unit 38 may also store the operating states of the nodes in a table format defined by database software.

The control instruction commanding means 36 uses information stored in the data storage location management information recording unit 32 and the access probability recording unit 35 to issue a control command to the distributed data registration/access means 1. Here, the control command is, for example, to change the operating state of a component such as a disk in a computer (specifically, to reduce the number of rotations of the disk, to reduce the number of clocks for the CPU, or to halt the component) or to turn off the entire computer of the distributed node.

For example, after a corresponding operating state in the node operating state recording unit 38 is rewritten, the control instruction commanding means 36 gives a control instruction to each distributed node to change its operating state. Note that each distributed node may include the node operating state recording unit 38. In this case, before the control instruction commanding means 36 changes the state of the distributed node, a corresponding operating state in the node operating state recording unit 38 included in the information management/control means 301 is rewritten and the rewritten operating state is notified to the other distributed nodes 101 to 104. After the operating state is updated, each of the distributed nodes 101 to 104 issues a response notification to the control instruction commanding means 36. After receiving the response notification from all the distributed nodes, the control instruction commanding means 36 gives the control instruction to change the operating state.

Thus, the control instruction commanding means 36 gives an instruction to the distributed node control means 14 to control the operating state of a controlled component in the distributed data registration/access means 1. The content of the control instruction can be predefined according to the controlled component.

Here, the control instruction commanding means 36 performs control on nodes by using a method to be illustrated below. Note that the following control method is an illustrative example, and any other method may be used to control the nodes.

(1) Nodes to which no access is expected are halted.

This is a method of calculating access probabilities of all data registered on the distributed nodes for each fixed period to halt a distributed node the access probability of which is a threshold value or less.

First, in this method, the access probability calculation/recording means 34 periodically reads an access history for the fixed period from the history storage unit 50 to calculate access probabilities and store the calculation results in the access probability recording unit 35. The control instruction commanding means 36 refers to the data storage location management information recording unit 32 and the access probability recording unit 35 to calculate the sum of the access probabilities of data registered on each distributed node. Then, the control instruction commanding means 36 gives a halt instruction to a distributed node of which the sum of the calculated access probabilities is the threshold value or less.

The control instruction commanding means 36 may give the halt instruction to a target distributed node immediately, or after a predetermined period has elapsed. When the halt instruction is given after the predetermined period has elapsed, the control instruction commanding means 36 may, for example, determine a halt schedule to give the halt instruction to the distributed node according to the schedule. In this case, the control instruction commanding means 36 may store the halt schedule in any storage device (not shown, which is referred to as schedule storage means below) provided in the information management/control apparatus 300. Note that information stored in the schedule storage means is not limited to the halt schedule, and it may be a schedule for starting up the distributed node.

The above description is made of the case where a distributed node to which no data access is expected is identified based on the access probabilities for the fixed period to halt the distributed node. Conditions capable of halting a distributed node include the following cases:

For example, when data to which READ access is performed is registered on two or more distributed nodes, the control instruction commanding means 36 has just to perform control to start up at least one of the distributed nodes. Thus, the number of distributed nodes to be started up is reduced so that further power saving can be expected.

Further, suppose that Write access to another distributed node is once performed without performing Write access to the distributed node as the access destination, and after that, data is moved to the distributed node as the access destination at predetermined timing (e.g., after the distributed node as the access destination is started up). When such control is performed, the control instruction commanding means 36 may perform control to halt the distributed node to which Write access is performed. Thus, the number of distributed nodes to be started up is reduced so that further power saving can be expected.

(2) Prescheduling.

This is a method of predetermining the time zones for starting up and halting each distributed node. For example, there is control to make all nodes work from Monday to Friday and halt half the nodes on weekends.

Such control is performed to reduce the total power usage so that, for example, the total power usage on weekends cannot exceed a constant amount. When this method is employed, the control instruction commanding means 36 issues a start-up command and a halt command to the distributed nodes according to the predetermined schedule.

Specifically, when a distributed node of which the sum of the calculated access probabilities is the threshold value or less is identified for each period, the control instruction commanding means 36 sets a halt schedule of the identified distributed node in the schedule storage means (not shown). Then, the control instruction commanding means 36 halts and starts up distributed nodes according to the schedule set for each period. When there is data having a high access probability during a set halt period, the control instruction commanding means 36 may perform control to transfer the data to a distributed node that is not halted. The schedule thus determined based on the access probabilities is referred to as schedule information.

Further, the control instruction commanding means 36 may reallocate data periodically based on this schedule information (i.e., information for start-up or halt for each period) according to the data location state and the access probabilities. For example, based on the schedule information, the control instruction commanding means 36 extracts candidates for a time zone in which each distributed node can be halted. Then, the control instruction commanding means 36 gives a control instruction to the distributed node control means 14 to reallocate, to another distributed node, data the access probability of which exceeds a predetermined value on the extracted distributed node in the time zone determined to be halted. This enables further power saving.

The control instruction commanding means 36 may also give a control instruction to move, to another distributed node, data on the distributed node with high access probabilities concentrated thereon to control the distributed node as the destination to work in the time zone. In such a case, performance can be improved.

The data storage location managing means 31, the access probability acquiring means 33, the access probability calculation/recording means 34, the control instruction commanding means 36, the data provisional probability generating means 37, the access accepting means 39, and the access history recording means 51 are implemented by a CPU of the computer operating according to a program (data access location selecting program). For example, the program is stored in a storage unit (not shown) in the information management/control apparatus 300 so that the CPU may read the program to operate as the data storage location managing means 31, the access probability acquiring means 33, the access probability calculation/recording means 34, the control instruction commanding means 36, the data provisional probability generating means 37, the access accepting means 39, and the access history recording means 51 according the program.

The data storage location managing means 31, the access probability acquiring means 33, the access probability calculation/recording means 34, the control instruction commanding means 36, the data provisional probability generating means 37, the access accepting means 39, and the access history recording means 51 may also be implemented by dedicated hardware, respectively.

Figure 8:
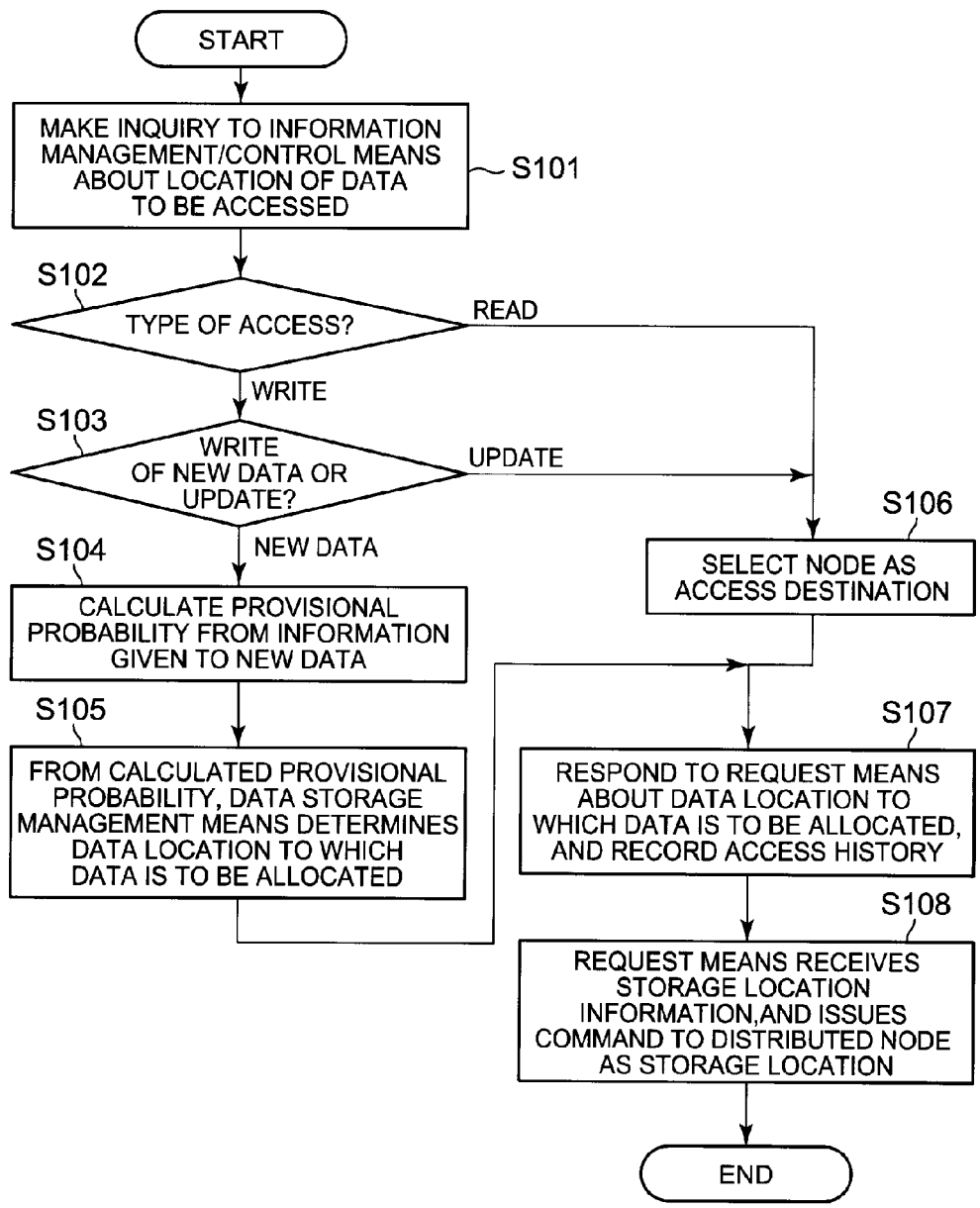
FIG. 8 It depicts a flowchart showing an example of data access processing according to the present invention.

Next, operation will be described. FIG. 8 is a flowchart showing an example of data access processing in the exemplary embodiment. The data access processing is started when the access destination inquiry means 41 of the data access request means 401 issues an access request command to the access accepting means 39 of the information management/control means 301. In other words, the access destination inquiry means 41 first issues the access request command to the access accepting means 39.

When accepting the access request command, the access accepting means 39 makes an inquiry to the data storage location managing means 31 about a distributed node(s) on which access target data is stored (step S101). For example, when the content illustrated in FIG. 3 is stored in the data storage location management information recording unit 32, access destinations of the file "/home/a.txt" (i.e., information on the storage nodes) are node 1 and node 2.

Next, the data storage location managing means 31 determines the type of access in the access request command (step S102). When the type of access is Write processing ("Write" in step S102), the procedure proceeds to step S103, while when it is READ processing ("Read" in step S102), the procedure proceeds to step S106. Note that the READ processing means data reading processing, and the Write processing means, in addition to processing for writing to data, processing other than the data reading processing, such as data deletion processing, data update processing, and file create processing.

When the type of access is the Write processing, the data storage location managing means 31 determines whether the access target data is new data (step S103). Specifically, the data storage location managing means 31 determines whether the access request command is the Write processing for new data or update processing for an access target file. In the following description, it is assumed that the Write processing for new data is determined when no access target file name exists in the data storage location management information recording unit 32, or the update processing for the access target file is determined when the file name exists.

When new data is determined ("new data" in step S103), the procedure proceeds to step S104, while the update processing is determined ("update" in step S103), the procedure proceeds to step S106.

In the case of new data, the data provisional probability generating means 37 uses information included in an access processing request command for the new data to estimate a future access probability of the new data (step S104). For example, the access processing request command has a content that "a file named /home/e.txt is newly created," the data provisional probability generating means 37 estimates the access probability of the file "/home/e.txt." In other words, the data provisional probability generating means 37 calculates a provisional access probability. In the above example, "/home/e.txt" corresponds to the information included in the access processing request command. The access processing request command may also include a program name as the command issuer, a process name, a user name to run the program, and the like.

The following will describe the operation when the access processing request command has the content that "a file named /home/e.txt is newly created." First, the access probability acquiring means 33 acquires the access probabilities of all files having an extension of txt from the access probability recording unit 35 in accordance with an instruction from the data provisional probability generating means 37. Next, the data provisional probability generating means 37 calculates an average value based on the respective access probability values, and adopts the average value as the access probability of the file "/home/e.txt."

Then, the data provisional probability generating means 37 stores the adopted access probability in the access probability recording unit 35. Further, the data provisional probability generating means 37 notifies the data storage location managing means 31 of the estimated access probability.

Next, the data storage location managing means 31 determines a data location to which the data is to be allocated from the notified provisional access probability (step S105 in FIG. 8). For example, the data storage location managing means 31 selects the same distributed node as that of data similar to the value of the provisional access probability (e.g., data having a difference in access probability that is a certain value or less) to determine the distributed node to be the data location. The selection of such a distributed node can lead to concentrating data accesses on the distributed node. Thus, accesses in a certain time zone become busy on limited distributed nodes so that the other distributed nodes can be halted (or their operating states can be changed to achieve power saving).

Further, the data storage location managing means 31 may refer to the information in the node operating state recording unit 38 to select a distributed node as the write destination from among distributed nodes working normally. Further, for example, when the distributed node determined to be the data location is not working normally, the data storage location managing means 31 may determine a distributed node working normally to be a distributed node on which temporary writing is performed. In this case, when the distributed node that did not work normally returns to the normal working state, the control instruction commanding means 36 gives a control instruction to the distributed node on which the temporary writing was performed to move data to the distributed node that has returned to the normal working state. Such control is so performed that the operation of unnecessary distributed nodes can be prevented while securing availability.

Further, the data storage location managing means 31 may determine the data location based on the schedule information stored in the schedule storage means (not shown). Specifically, among the calculated access probabilities of data, a node working normally (i.e., active) in a certain time zone during which there is access to the data may be read from the schedule storage means to determine the node to be the data location to which the data is to be allocated. When there are two or more operating (normally working) distributed nodes, the data storage location managing means 31 has just to determine one distributed node based on predefined logic.

The following will describe a method of determining a data location based on the schedule information by using a specific example. For example, suppose that a working schedule of three distributed nodes, node 1, node 2, and node 3, is so set that node 1 works on Monday, Wednesday, and Friday, node 2 works on Tuesday, Thursday, and Saturday, and node 3 works on Sunday. Here, suppose that data A is newly created, and it is found from the provisional access probability that accesses to the data will become busy on Monday (i.e., data the access probability of which is enormously high on Monday). In this case, the data storage location managing means 31 determines node 1 to be the location to which data A is to be allocated.

The method of determining a data location based on the schedule information will be further described by using another specific example. Suppose that it is found that, as a result of calculating the provisional access probability of data A newly created, it is data the access probability of which is high during daytime on weekdays and which is accessed rarely on Sunday. Suppose further that the working schedule in this case is so set that distributed nodes of node 1 to node 100 work during daytime on weekdays, distributed nodes of node 1 to node 10 work during nighttime on weekdays, and distributed nodes of node 11 to node 15 work on weekends and holidays. In this case, the data storage location managing means 31 determines node 11 to node 15 to be locations to which data A is to be allocated. When data to be accessed on weekends and holidays increase, the control instruction commanding means 36 may, for example, change the schedule information to indicate that "distributed nodes of node 11 to node 20 work on weekends and holidays."

The above description is made of the case where data locations to which the data is to be allocated is determined from among the distributed nodes on which files similar in access probability are stored. However, various changes can be made to the method of determining the data locations depending on the implemented system and the status of access to the files.

For example, suppose that, in a system for writing data to multiple distributed nodes, there is such a file that is almost read after being written for the first time. In this case, the data storage location managing means 31 may determine a distributed node(s) so that access to at least one of the distributed nodes as write destinations will be busy. This is because, if only the distributed node(s) on which access is busy is made to work, reading processing can be performed on the target data even when the node as the write destination has been halted.

The data storage location managing means 31 may also determine to store files of the same access pattern on another node to secure the performance of the distributed storage system.

After step S105, the procedure proceeds to step S107.

When the type of access is the READ processing in step S102, or when the access request command is the update processing in step S103, the data storage location managing means 31 selects a distributed node as the access destination (step S106).

Specifically, when the type of access is the READ processing in step S102, the data storage location managing means 31 selects any one of the distributed nodes obtained in step S101 (i.e., read from the data storage location management information recording unit 32). For example, in the case of the file "/home/a.txt" illustrated in FIG. 3, the READ destination candidates are node 1 or node 2. The data storage location managing means 31 may use, for example, a round-robin method to select a distributed node. Alternatively, based on the operating states of the distributed nodes stored in the node operating state recording unit 38, the data storage location managing means 31 may select, by an arbitrary method, any one of distributed nodes normally working. Note that the method of selecting a distributed node is not limited to the above methods.

On the other hand, when the access request command is the update processing in step S103, the data storage location managing means 31 selects all distributed nodes as writing targets. The data storage location managing means 31 refers to the information in the node operating state recording unit 38, and when a target distributed node is halted (or in a power-saving operating state), it may select a normally working distributed node as a distributed node on which temporary writing is performed. In this case, when the distributed node that was not working normally returns to the normal working state, the control instruction commanding means 36 gives a control instruction to the distributed node on which temporary writing was performed to move data to the distributed node that has returned to the normal working state.

Further, when the distributed node selected as the write destination is halted in step S106, the control instruction commanding means 36 may issue a start-up command to the distributed node.

After step S105 or step S106, in response to the data access request means 401, the access accepting means 39 requests the access history recording means 51 to perform access history recording processing on the distributed node information as a target of data access (step S107). Finally, when the data access request means 401 receives the distributed node information on the access destination, the data access means 42 issues an access request command to the distributed data registration/access means 1 of the specified distributed node (step S108). The data access processing means 11 performs processing based on the received access request command, and sends the processing result to the data access request means 401.

The above description is made of the case where the data provisional probability generating means 37 calculates a provisional access probability at the timing of the access request to new data, and stores the calculated access probability in the access probability recording unit 35. Alternatively, the access probability calculation/recording means 34 may calculate an access probability in any cycle, and store the access probability in the access probability recording unit 35.

For example, the access probability calculation/recording means 34 may calculate an access probability each time data reallocation processing is performed or each time the access probability is read As for the provisional access probability, the access probability calculation/recording means 34 may also calculate an access probability based on the actual access history after a certain period has elapsed, and update the content of the access probability recording unit 35 using the calculated value.

In the distributed storage system for storing data on multiple distributed nodes, there is a case where writing processing may not need to be performed on two or more distributed nodes specified as copy destinations in data writing processing. For example, even when replicated data has to be stored on six distributed nodes in preparation for access busy time, there is a case where data has just to be stored on two distributed nodes at the beginning to secure system availability.

In this case, when the data access request command has been received for the first time, the data storage location managing means 31 may respond to the data access request means 401 to set the two distributed nodes smallest in number as the distributed nodes on which writing processing is performed. Then, based on the information recorded in the access probability recording unit 35, the data storage location managing means 31 may determine a time zone in which the number of data accesses is high, and respond to the data access request means 401 to set the remaining four distributed nodes as the distributed nodes on which writing processing is to be performed by the time.

The above description is made of the case where the information management/control apparatus 300 manages the multiple distributed nodes 101 to 104. In other words, the description is made of the case where the information management/control apparatus 300 includes the information management/control means 301 and distributed node 101 includes the distributed data registration/access means 1. Instead of such a configuration, the distributed node 101 may also include both the distributed data registration/access means 1 and the information management/control means 301. In this case, the multiple distributed nodes 101 to 104 may work in cooperation with each other to operate as in the aforementioned exemplary embodiment. For example, an access probability of data in a storage device provided in each distributed node has just to be calculated to control a controlled component based on the access probability.

As described above, according to the exemplary embodiment, the data storage location managing means 31 determines a read destination and/or a write destination of specified data from distributed nodes corresponding to the data stored in the data storage location management information recording unit 32. Then, based on the access history stored in the history storage unit 50, the access probability calculation/recording means 34 calculates an access probability, and stores the calculated access probability in the access probability recording unit 35. On the other hand, when no node corresponding to the specified data is stored in the data storage location management information recording unit 32, the data provisional probability generating means 37 estimates an access probability of the specified data based on the access probabilities stored in the access probability recording unit 35. In this case, the data storage location managing means 31 determines a write destination of the data based on the estimated access probability.

Therefore, in the distributed storage system according to the present invention, even when new data is added, the power consumption related to data access can be reduced.

Specifically, in the distributed storage system, the data storage location managing means 31 determines a data access destination based on the future access probability (i.e., provisional access probability). Thus, since the physical location to which newly created data or its replica is to be allocated can be determined at the time of initial allocation, the amount of processing for moving data such as reallocation can be reduced, enabling power saving.

Further, the control instruction commanding means 36 can change the operating states of the distributed nodes making up the distributed system based on the provisional access probability before the registration of data, enabling efficient power saving control.

Further, since the control instruction commanding means 36 moves data on a distributed node according to the access probability, a distributed node can be selected to maintain the power-saving working state of the system.

In addition, the access history recording means 51 records the identification name and usage of data as an access history for each data. Therefore, the power saving effect can be provided to even data different in access pattern in the same service or the same user.

For example, in the method disclosed in PTL 1 and the system disclosed in PTL 2, the physical locations to which new data and its replica are to be allocated cannot be determined at the beginning of storing the data. This is because, in the method of calculating an access probability based on past access history data, it cannot be anticipated how the data is used in future, resulting in the lack of information for determining the initial location to which the data is to be initially allocated. As a result, the access probability is calculated after registration, and then a data copy is performed. In such a situation, if a massive number of data copies are generated, large I/O bandwidths of a network and a bus will be used, and this will adversely affect the performance of an application running on the distributed system. However, according to the exemplary embodiment, a provisional access probability is calculated for new data to locate the data in an appropriate position. This reduces the data migration cost, enabling reduction in power consumption.

Further, for example, in the system disclosed in PTL 2, the access history and access probability of data is handled in units of slices as physical locations, each of which is obtained by segmenting a volume into constant units and to which the data is to be allocated. In such a case, data stored on the same slice cannot be separated in reallocation processing. In other words, when a volume is allocated to each service or each user, it is difficult to deal with respective pieces of data different in access pattern for each service and each user. However, in the exemplary embodiment, access probabilities are calculated data by data, enabling flexible response to each data.

Figure 9:
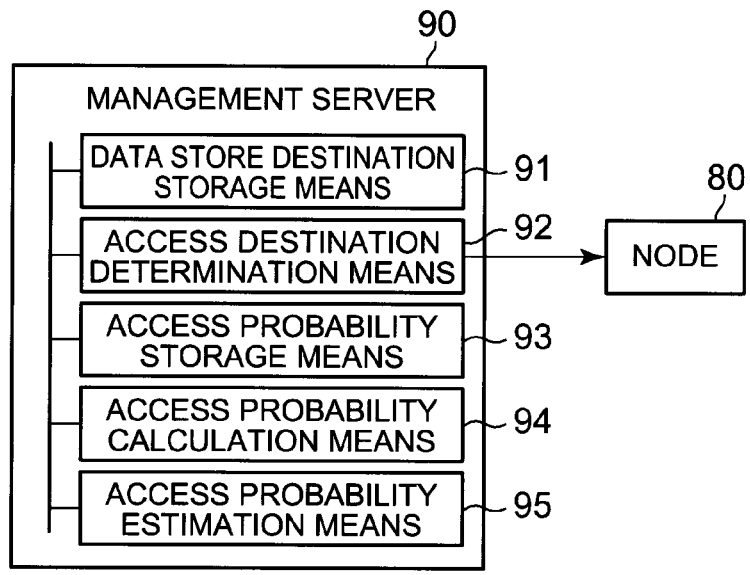
FIG. 9 It depicts a block diagram showing an example of the minimal configuration of a data access location selecting system according to the present invention.
Figure 10:
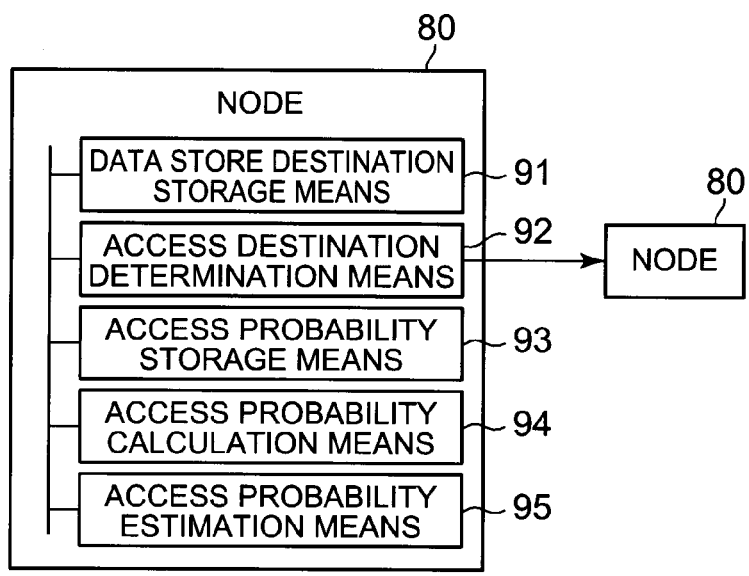
FIG. 10 It depicts a block diagram showing an example of the minimal configuration of a data access location selecting device according to the present invention.

Next, minimal configurations of the present invention will be described. FIG. 9 is a block diagram showing an example of the minimal configuration of a data access location selecting system according to the present invention. FIG. 10 is a block diagram showing an example of the minimal configuration of another data access location selecting system according to the present invention.

The data access location selecting system illustrated in FIG. 9 includes at least one or more nodes 80 (e.g., the distributed node 101) for storing data, and a management server 90 (e.g., the information management/control apparatus 300) for selecting a read destination and/or a write destination of data from the nodes.

The management server 90 includes: data store destination storage means 91 (e.g., the data storage location management information recording unit 32) for storing a data storage destination in association with the node 80; access destination determination means 92 (e.g., the data storage location managing means 31) for determining the read destination and/or the write destination of specified data from nodes corresponding to the data and stored in the data store destination storage means 91; access probability storage means 93 (the access probability recording unit 35) for storing an access probability indicative of a probability that data reading and/or writing is performed on each node 80; access probability calculation means 94 (e.g., the access probability calculation/recording means 34) for calculating the access probability based on a history of accesses to the data (e.g., the access history stored in the history storage device 50), and storing the calculated access probability in the access probability storage means; and access probability estimation means 95 (e.g., the data provisional probability generating means 37) for estimating an access probability of the specified data based on access probabilities stored in the access probability storage means 93.

When no node corresponding to the specified data is stored in the data store destination storage means 91, the access probability estimation means 95 estimates an access probability of the data (such as to calculate an average value of access probabilities of data having the same extension, calculate an average value of access probabilities of data in the same directory, calculate an average value of access probabilities of data processed by the same application on the access destination, or calculate a co-occurrence probability).

When no node corresponding to the specified data is stored in the data store destination storage means 91, the access destination determination means 92 determines a write destination of the data based on the estimated access probability (such as to determine, to be the access destination, a node on which data similar in access probability is stored or to select a node working in a period that exceeds a predetermined access probability).

The data access location selecting system illustrated in FIG. 10 includes multiple nodes 80 (e.g., the distributed node 101 to 104). Each node 80 includes data store destination storage means 91, access destination determination means 92, access probability storage means 93, access probability calculation means 94, and access probability estimation means 95. Note that the contents of the data store destination storage means 91, the access destination determination means 92, the access probability storage means 93, the access probability calculation means 94, and the access probability estimation means 95 are the same as those shown in FIG. 9.

According such configurations, even when new data is added in a distributed storage system, the power consumption related to data access can be suppressed.

At least data access location selecting systems shown below will be disclosed in either of the exemplary embodiments described above.

(1) A data access location selecting system including at least one or more nodes (e.g., the distributed node 101) for storing data, and a management server (e.g., the information management/control apparatus 300) for selecting a read destination and/or a write destination of data from the nodes, the management server including: data store destination storage means (e.g., the data storage location management information recording unit 32) for storing a data storage destination in association with a node; access destination determination means (e.g., the data storage location managing means 31) for determining the read destination and/or the write destination of specified data from nodes corresponding to the data and stored in the data store destination storage means; access probability storage means (the access probability recording unit 35) for storing an access probability indicative of a probability that data reading and/or writing is performed on each node; access probability calculation means (e.g., the access probability calculation/recording means 34) for calculating the access probability based on a history of accesses to the data (e.g., the access history stored in the history storage device 50), and storing the calculated access probability in the access probability storage means; and access probability estimation means (e.g., the data provisional probability generating means 37) for estimating an access probability of the specified data based on access probabilities stored in the access probability storage means, wherein when no node corresponding to the specified data is stored in the data store destination storage means, the access probability estimation means estimates an access probability of the data, and the access destination determination means determines a write destination of the data based on the estimated access probability when no node corresponding to the specified data is stored in the data store destination storage means (such as to determine, to be the access destination, a node on which data similar in access probability is stored or to select a node working in a period that exceeds a predetermined access probability).

(2) The data access location selecting system wherein the access destination determination means determines, to be the write destination of the data, a node storing data having an access probability that falls within a range between the estimated access probability and a predetermined value from among access probabilities recorded in access probability recording means (e.g., data similar to a provisional access probability).

(3) The data access location selecting system further including node working schedule determining means (e.g., the control instruction commanding means 36) for determining a working schedule (e.g., halt schedule) of each node in each time zone based on the estimated access probability, wherein the access destination determination means determines, to be the read destination and/or the write destination of the data, a node the working schedule of which is in operation in a time zone in which the estimated access probability exceeds the predetermined value.

(4) The data access location selecting system further including control instruction commanding means (e.g., the control instruction commanding means 36) for issuing a control instruction command to a node, wherein the control instruction commanding means commands the control instruction (e.g., halt instruction) to the node based on the working schedule.

(5) The data access location selecting system wherein the access probability estimation means extracts, from the access probability storage means, access probabilities of data having the same extension as the specified data to estimate an average value of the extracted access probabilities to be the access probability of the specified data.

(6) The data access location selecting system wherein the access probability estimation means extracts, from the access probability storage means, access probabilities of data stored in the same directory (e.g., directory path "/home") as the specified data to estimate an average value of the extracted access probabilities to be the access probability of the specified data.

(7) The data access location selecting system wherein the access probability estimation means calculates a co-occurrence probability (e.g., using (Eq. 1)) based on histories of accesses to data and access probabilities stored in the access probability storage means to estimate the access probability of the specified data.

(8) A data access location selecting system including multiple nodes (e.g., the distributed nodes 101 to 104) for storing data, each of the nodes including: data store destination storage means (e.g., the data storage location management information recording unit 32) for storing a data storage destination in association with a node; access destination determination means (e.g., the data storage location managing means 31) for determining a read destination and/or a write destination of specified data from nodes corresponding to the data and stored in the data store destination storage means; access probability storage means (the access probability recording unit 35) for storing an access probability indicative of a probability that data reading and/or writing is performed on each node; access probability calculation means (e.g., the access probability calculation/recording means 34) for calculating the access probability based on a history of accesses to the data (e.g., the access history stored in the history storage device 50), and storing the calculated access probability in the access probability storage means; and access probability estimation means (e.g., the data provisional probability generating means 37) for estimating an access probability of the specified data based on access probabilities stored in the access probability storage means, wherein when no node corresponding to the specified data is stored in the data store destination storage means, the access probability estimation means estimates an access probability of the data, and the access destination determination means determines a write destination of the data based on the estimated access probability when no node corresponding to the specified data is stored in the data store destination storage means (such as to determine, to be the access destination, a node on which data similar in access probability is stored or to select a node working in a period that exceeds a predetermined access probability).

Part of or the entire aforementioned exemplary embodiment can also be described as, but not limited to, the following supplementary notes:

(Supplementary Note 1) A data access location selecting system characterized by including at least one or more nodes for storing data, and a management server for selecting a read destination and/or a write destination of data from the nodes, the management server including: data store destination storage means for storing a data storage destination in association with a node; access destination determination means for determining the read destination and/or the write destination of specified data from nodes corresponding to the data and stored in the data store destination storage means; access probability storage means for storing an access probability indicative of a probability that data reading and/or writing is performed on each node; access probability calculation means for calculating the access probability based on a history of accesses to the data, and storing the calculated access probability in the access probability storage means; and access probability estimation means for estimating an access probability of the specified data based on access probabilities stored in the access probability storage means, wherein when no node corresponding to the specified data is stored in the data store destination storage means, the access probability estimation means estimates an access probability of the data, and the access destination determination means determines a write destination of the data based on the estimated access probability when no node corresponding to the specified data is stored in the data store destination storage means.

(Supplementary Note 2) The data access location selecting system according to Supplementary Note 1, wherein the access destination determination means determines, to be the write destination of the data, a node storing data having an access probability that falls within a range between the estimated access probability and a predetermined value from among access probabilities recorded in access probability recording means.

(Supplementary Note 3) The data access location selecting system according to Supplementary Note 1 or Supplementary Note 2, further including node working schedule determining means for determining a working schedule of each node in each time zone based on the estimated access probability, wherein the access destination determination means determines, to be the read destination and/or the write destination of the data, a node the working schedule of which is in operation in a time zone in which the estimated access probability exceeds the predetermined value.

(Supplementary Note 4) The data access location selecting system according to Supplementary Note 3, further including control instruction commanding means for issuing a control instruction command to a node, wherein the control instruction commanding means commands the control instruction to the node based on the working schedule.

(Supplementary Note 5) The data access location selecting system according to any one of Supplementary Note 1 to Supplementary Note 4, wherein the access probability estimation means extracts, from the access probability storage means, access probabilities of data having the same extension as the specified data to estimate an average value of the extracted access probabilities to be the access probability of the specified data.

(Supplementary Note 6) The data access location selecting system according to any one of Supplementary Note 1 to Supplementary Note 4, wherein the access probability estimation means extracts, from the access probability storage means, access probabilities of data stored in the same directory as the specified data to estimate an average value of the extracted access probabilities to be the access probability of the specified data.

(Supplementary Note 7) The data access location selecting system according to any one of Supplementary Note 1 to Supplementary Note 4, wherein the access probability estimation means calculates a co-occurrence probability based on histories of accesses to data and access probabilities stored in the access probability storage means to estimate the access probability of the specified data.

(Supplementary Note 8) The data access location selecting system according to any one of Supplementary Note 1 to Supplementary Note 7, wherein the access probability calculation means calculates an access probability based on an access history including information indicative of the source of access to the data, and stores the calculated access probability in the access probability storage means, and the access probability estimation means extracts, from the access probability storage means, access probabilities of data identical in the source of access to the specified data, and estimates an average value of the extracted access probabilities to be the access probability.

(Supplementary Note 9) The data access location selecting system according to any one of Supplementary Note 1 to Supplementary Note 8, further including node state storage means for storing the operating states of the nodes, wherein the access destination determination means determines the read destination and/or the write destination of the data from among nodes the operating states of which are working and which are stored in the node state storage means.

(Supplementary Note 10) The data access location selecting system according to any one of Supplementary Note 1 to Supplementary Note 9, further including access log collecting means for collecting logs of accesses to data, wherein the access probability calculation means calculates an access probability based on the access logs collected by the access log collecting means.

(Supplementary Note 11) The data access location selecting system according to Supplementary Note 10, wherein the access log collecting means collects access logs including given information as information indicative of the contents of accesses to the data, and the access probability calculation means calculates an access probability for each given information based on the access log, and stores the calculated access probability in the access probability storage means.

(Supplementary Note 12) The data access location selecting system according to any one of Supplementary Note 1 to Supplementary Note 11, wherein the access probability calculation means calculates an access probability and an access frequency as information indicative of the frequency of access to the data based on the history of accesses to the data to calculate an evaluation value as information indicative of the characteristics of accesses to the data based on the access probability and the access frequency, and stores the evaluation value in the access probability storage means, and the access probability estimation means estimates an access probability of the specified data based on the evaluation value stored in the access probability storage means.

(Supplementary Note 13) A data access location selecting system characterized by including multiple nodes for storing data, each of the nodes including: data store destination storage means for storing a data storage destination in association with a node; access destination determination means for determining a read destination and/or a write destination of specified data from nodes corresponding to the data and stored in the data store destination storage means; access probability storage means for storing an access probability indicative of a probability that data reading and/or writing is performed on each node; access probability calculation means for calculating the access probability based on a history of accesses to the data, and storing the calculated access probability in the access probability storage means; and access probability estimation means for estimating an access probability of the specified data based on the access probabilities stored in the access probability storage means, wherein when no node corresponding to the specified data is stored in the data store destination storage means, the access probability estimation means estimates an access probability of the data, and the access destination determination means determines a write destination of the data based on the estimated access probability when no node corresponding to the specified data is stored in the data store destination storage means.

(Supplementary Note 14) A data access location selecting method characterized by including: causing a selection device for selecting a read destination and/or a write destination of data from among at least one or more nodes storing the data to determine the read destination and/or the write destination of specified data from among nodes corresponding to the data and stored in data store in destination storage means for storing a data storage destination in association with a node; causing the selection device to calculate an access probability indicative of a probability that data reading and/or writing is performed on each node based on a history of accesses to the data, and storing the calculated access probability in access probability storage means; causing the selection device to estimate an access probability of the specified data based on access probabilities stored in the access probability storage means when no node corresponding to the specified data is stored in the data store destination storage means; and causing the selection device to determine a write destination of the data based on the estimated access probability when no node corresponding to the specified data is stored in the data store destination storage means.

(Supplementary Note 15) The data access location selecting method according to Supplementary Note 14, wherein a node storing data having an access probability that falls within a range between the estimated access probability and a predetermined value is determined to be the write destination of the data from among access probabilities recorded in access probability recording means.

(Supplementary Note 16) A data access location selecting program applied to a computer for selecting a read destination and/or a write destination of data from at least one or more nodes storing the data, characterized by causing the computer to perform: access destination determination processing for determining the read destination and/or the write destination of specified data from nodes corresponding to the data and stored in data store destination storage means for storing a data storage destination in association with a node; access probability calculation processing for calculating an access probability indicative of a probability that data reading and/or writing is performed on each node based on a history of accesses to the data, and storing the calculated access probability in access probability storage means; and access probability estimation processing for estimating an access probability of the specified data based on access probabilities stored in the access probability storage means, wherein when no node corresponding to the specified data is stored in the data store destination storage means, the access probability of the data is estimated in the access probability estimation processing, and a write destination of the data is determined based on the estimated access probability in the access destination determination processing when no node corresponding to the specified data is stored in the data store destination storage means.

(Supplementary Note 17) The data access location selecting program according to Supplementary Note 16, wherein a node storing data having an access probability that falls within a range between the estimated access probability and a predetermined value is determined in the access destination determination processing to be the write destination of the data from among access probabilities recorded in access probability recording means.

As described above, although the present invention is described with reference to the exemplary embodiment, the present invention is not limited to the aforementioned exemplary embodiment. Various changes that can be understood by those skilled in the art within the scope of the present invention can be made to the configurations and details of the present invention.

This application claims priority based on Japanese Patent Application No. 2010-75514, filed Mar. 29, 2010, the entire disclosure of which is incorporated herein by reference.

INDUSTRIAL APPLICABILITY

The present invention can be suitably applied to a data access location selecting system for selecting a read destination and/or a write destination of data in a distributed storage system. In other words, the present invention is applicable to a distributed storage system for storing data on multiple computers in a distributed manner, and further applicable to a general IT system capable of using the same.

REFERENCE SIGNS LIST

1 Distributed Data Registration/Access Means
11 Data Access Processing Means
12 Storage Device
13 Controlled Device
14 Distributed Node Control Means
31 Data Storage Location Managing Means
32 Data Storage Location Management Information Recording Unit
33 Access Probability Acquiring Means
34 Calculation of Access Probability Recording Means
35 Access Probability Recording Unit
36 Control Instruction Commanding Means
37 Data Provisional Probability Generating Means
38 Node Operating State Recording Unit
39 Access Accepting Means
41 Access Destination Inquiry Means
42 Data Access Means
50 History Storage Device
51 Access History Recording Means
101 to 104 Distributed Node
111 to 114 Storage Device
200 Communication Network
300 Information Management/Control Apparatus
301 Information Management/Control Means
400 Data Access Requesting Node
401 Data Access Request Means

The invention claimed is:

1. A data access location selecting system comprising:
at least one node that stores existing data; and
a management server,
the management server including:
a data store destination storage unit that stores destination information of the existing data in association with the at least one node;
an access destination determination unit that determines a write destination of specified data for the at least one node;
an access probability storage unit that stores a calculated access probability indicative of a probability that at least one of data reading and writing is performed on the at least one node, wherein the calculated access probability is based on a history of accesses to the existing data;
an access probability calculation unit that provides the calculated access probability for storing in the access probability storage unit; and
an access probability estimation unit that provides an access probability of the specified data based on access probabilities in the access probability storage unit if the specified data corresponds to an entry of the destination information, wherein
if no entry of destination information corresponding to the specified data is stored in the data store destination storage unit and a history of accesses to the specified data is unknown, the access probability estimation unit estimates an access probability of the specified data based on at least one of the history of accesses to the existing data and the access probabilities, and
the access destination determination unit determines the write destination of the specified data based on the provided access probability or the estimated access probability.

2. The data access location selecting system according to claim 1, wherein the at least one node comprises a plurality of nodes, and wherein the access destination determination unit determines, to be the write destination of the specified data, a node of the plurality of nodes that stores existing data having an access probability that falls within a range between the estimated access probability and a predetermined value from among access probabilities recorded in the access probability storage unit.

3. The data access location selecting system according to claim 1, further comprising
a node working schedule determining unit that determines a working schedule of the at least one node based on the estimated access probability,
wherein the at least one node comprises a plurality of nodes, and wherein the access destination determination unit specifies a time zone in which the estimated access probability exceeds a predetermined value, and determines a node of the plurality of nodes that has a working schedule which is in operation in the specified time zone, as the write destination of the specified data.

4. The data access location selecting system according to claim 3, further comprising
a control instruction commanding unit for issuing a control instruction command to at least one of the plurality of nodes,
wherein the control instruction commanding unit commands the control instruction based on the working schedule.

5. The data access location selecting system according to claim 1, wherein the access probability estimation unit extracts, from the access probability storage unit, access probabilities of the existing data having an extension identical to that of the specified data to estimate an average value of the extracted access probabilities to be the estimated access probability of the specified data.

6. The data access location selecting system according to claim 1, wherein the access probability estimation unit extracts, from the access probability storage unit, access probabilities of the existing data stored in a directory identical to that of the specified data to estimate an average value of the extracted access probabilities to be the estimated access probability of the specified data.

7. The data access location selecting system according to claim 1, wherein the access probability estimation unit calculates a co-occurrence probability based on histories of accesses to the existing data and calculated access probabilities stored in the access probability storage unit to provide the estimated access probability of the specified data.

8. The data access location selecting system according to claim 1, wherein the access probability estimation unit extracts, from the access probability storage unit, access probabilities of the existing data to estimate an average value of the extracted calculated access probabilities to be the estimated access probability, wherein the existing data has a file name and a portion of the file name is similar to a file name of the specified data.

9. The data access location selecting system according to claim 1, wherein the access probability estimation unit extracts, from the access probability storage unit, access probabilities of the existing data to estimate an average value of the extracted calculated access probabilities to be the estimated access probability, wherein the existing data is associated with an application that is the same as an application associated with the specified data.

10. The data access location selecting system according to claim 1, wherein power to the at least one node is controlled based on the calculated access probability.

11. The data access location selecting system according to claim 10, wherein the power is controlled by changing an operating state of a component associated with the at least one node.

12. The data access location selecting system according to claim 1, wherein the specified data is data to be stored in a new file.

13. A data access location selecting system comprising
a plurality of nodes that store existing data,
the plurality of nodes including:
a data store destination storage unit that stores destination information of the existing data in association with at least one of the nodes;
an access destination determination unit that determines a write destination of specified data for the plurality of nodes;
an access probability calculation unit that calculates an access probability based on a history of accesses to the existing data, wherein the calculated access probability is indicative of a probability that at least one of data reading and writing is performed on the plurality of nodes;
an access probability storage unit that stores the calculated access probability; and
an access probability estimation unit that provides an access probability of the specified data based on access probabilities in the access probability storage unit if the specified data corresponds to an entry of the destination information, wherein
if no entry of destination information corresponding to the specified data is stored in the data store destination storage unit and a history of accesses to the specified data is unknown, the access probability estimation unit estimates an access probability of the specified data based on at least one of the history of accesses to the existing data and the access probabilities, and
the access destination determination unit determines the write destination of the specified data based on the provided access probability or the estimated access probability.

14. A data access location selecting method comprising:
providing at least one node;
storing in a data store destination storage unit destination information of existing data stored at the at least one node;
calculating an access probability indicative of a probability that at least one of data reading and writing is performed on the at least one node based on a history of accesses to the existing data, and storing the calculated access probability in an access probability storage unit;
specifying data to be written to the at least one node;
providing an access probability of the specified data based on access probabilities in the access probability storage unit if the specified data corresponds to an entry of the destination information, wherein
if no entry of destination information corresponding to the specified data is stored in the data store destination storage unit and a history of accesses to the specified data is unknown, estimating an access probability of the specified data based on at least one of the history of accesses to the existing data and the access probabilities; and
determining a write destination of the specified data based on the provided access probability or the estimated access probability.

15. A data access system comprising:
at least one processor; and
at least one non-transitory computer-readable medium having instructions stored thereon that cause the at least one processor to perform the following:
storing in a data store destination storage unit destination information of existing data stored at least one node;
calculating an access probability indicative of a probability that at least one of data reading and writing is performed on the at least one node based on a history of accesses to the existing data, and storing the calculated access probability in an access probability storage unit;
receiving new data to be written to the at least one node;
providing an access probability of the received new data based on access probabilities in the access probability storage unit if the received new data corresponds to an entry of the destination information, wherein
if no entry of destination information corresponding to the received new data is stored in the data store destination storage unit and a history of accesses to the specified data is unknown, estimating an access probability of the received new data based on at least one of the history of accesses to the existing data and the access probabilities; and
determining a write destination of the received new data based on the provided access probability or the estimated access probability.

16. The data access system according to claim 15, wherein the at least one node comprises a plurality of nodes, and the at least one processor determines if the estimated access probability falls within a range between an access probability and a predetermined value, when determining the write destination.

17. The data access system according to claim 15, wherein the at least one processor determines a working schedule of the at least one node based on the estimated access probability.

18. The data access system according to claim 15, wherein the at least one processor issues a control instruction to the at least one node.

19. The data access system according to claim 15, wherein the at least one processor extracts calculated access probabilities of the existing data having an extension identical to that of the received new data to estimate an average value of the extracted access probabilities to be the estimated access probability of the received new data.

20. The data access system according to claim 15, wherein the at least one processor extracts access probabilities of the existing data stored in a directory identical to that of the received new data to estimate an average value of the extracted access probabilities to be the estimated access probability of the received new data.

21. The data access system according to claim 15, wherein the at least one processor extracts access probabilities of the existing data to estimate an average value of the extracted access probabilities to be the estimated access probability, wherein the existing data has a file name and a portion of the file name is similar to a file name of the received new data.

22. The data access system according to claim 15, wherein the at least one processor extracts access probabilities of the existing data to estimate an average value of the extracted access probabilities to be the estimated access probability, wherein the existing data is associated with an application that is the same as an application associated with the received new data.

23. The data access system according to claim 15, wherein power to the at least one node is controlled based on the calculated access probability.

24. The data access system according to claim 23, wherein the power is controlled by changing an operating state of a component associated with the at least one node.

25. The data access system according to claim 15, wherein the received new data is data to be stored in a new file.

\* \* \* \* \*